United States Patent [19]
Button

[11] 3,867,835
[45] Feb. 25, 1975

[54] CALIBRATION OF PARTICLE VELOCITY MEASURING INSTRUMENT

[75] Inventor: Roger E. Button, Rochester, N.Y.

[73] Assignee: Bausch & Lomb Incorporated, Rochester, N.Y.

[22] Filed: Oct. 19, 1973

[21] Appl. No.: 408,247

[52] U.S. Cl............ 73/1 D, 73/3, 73/488, 250/222 PC, 356/27, 356/28, 356/243
[51] Int. Cl............ G01p 21/00, G01p 5/20
[58] Field of Search ......... 73/1 R, 3, 1 D, 488, 489; 250/573, 222 PC; 356/27, 28, 243

[56] References Cited
FOREIGN PATENTS OR APPLICATIONS
1,145,830  3/1963  Germany.............................. 73/1 R Primary Examiner—Jerry W. Myracle
Assistant Examiner—Frederick Shoon
Attorney, Agent, or Firm—Frank C. Parker, Bernard D. Bogdan

[57] ABSTRACT

In an analytical apparatus for analysis of particulate motion in a flow cell, there is provided, for calibration of the analytical apparatus, a movable calibration slide generally disposed to translate into and out of the optical viewing path of the analytical system devoted to calculating particle related information. Appropriately located upon the surface of the slide is a predetermined number of contrast regions representing particles. The slide is translated at a given rate within the optical viewing path and simulates predetermined particle movement for use in calibration of analytical devices for obtaining particle information.

7 Claims, 3 Drawing Figures

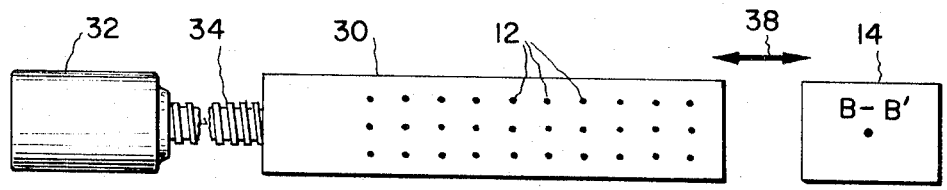
FIG. 1
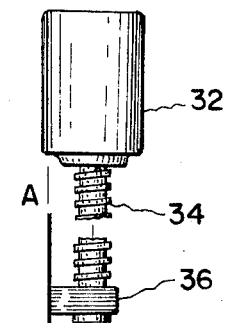
FIG. 2
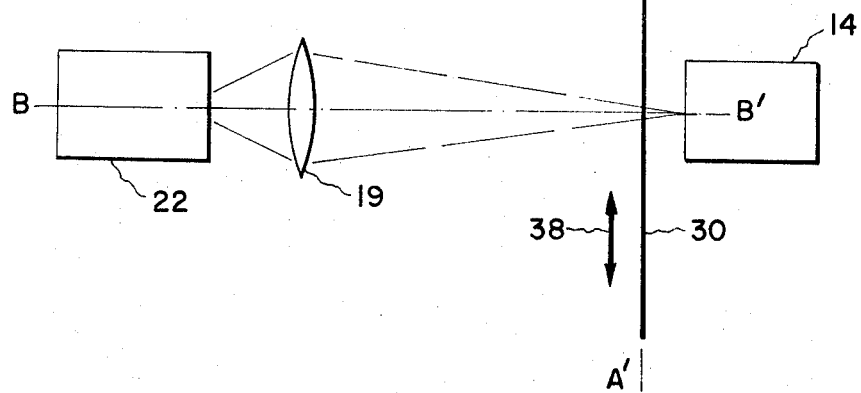
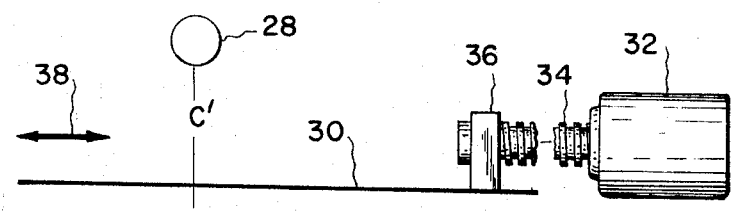
FIG. 3
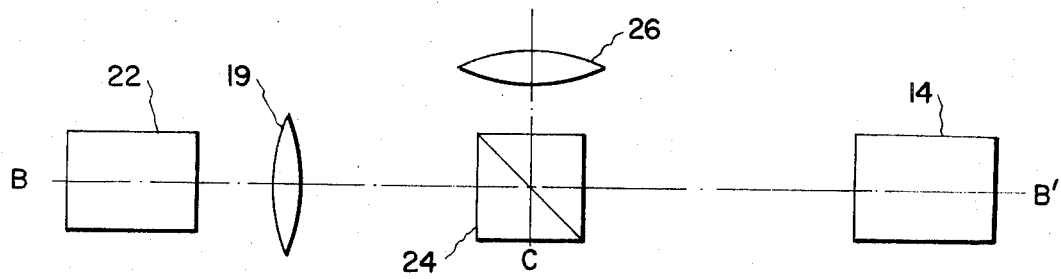

CALIBRATION OF PARTICLE VELOCITY MEASURING INSTRUMENT

FIELD OF THE INVENTION

The present invention relates to apparatus for and a method of automatically calibrating particle tracking devices, particularly for those devices having measurement cells for carrying fluid bearing particles.

SUMMARY OF THE INVENTION

A slide for modulating intensity of light in a system preferably for analytical study of fluid-borne particles, has disposed upon its surface, either randomly or preferably in a predetermined pattern, contrast areas and preferably areas of sharp contrast such as dark areas on a light surface, simulating particles for use in calibration of the analytical system. The slide is moved and preferably linearly translated to pass the areas of contrast before the transmitted light of the analytical system at a predetermined velocity, or to appropriately reflect light into the system, to thereby obtain the type of information otherwise collected from the fluid-borne particles in the measuring cell. Images of the contrast areas moving with known velocity, simulate particle-movement related information as a check on the calibration of the analytical system.

BRIEF DESCRIPTION OF THE DRAWINGS

FIG. 1 is a front view of a translatable calibration slide according to the principles of the present invention before a schematic illustrated analytical system;

FIG. 2 is a top view of the preferred embodiment of FIG. 1 disposed before a vidicon tube in the analytical system; and FIG. 3 is a side view of an alternate embodiment of a calibration slide adapted for translatory movement before a schematically illustrated analytical system, using reflected light.

DETAILED DESCRIPTION OF THE PREFERRED EMBODIMENT

In a separate concurrently filed and copending patent application entitled "Calibration of Particle Velocity Measuring Instrument," Ser. No. 408,217 for applicants R. H. Burns, A. E. Martens, R. R. Morton and present applicant R. E. Button, the broader basis for consideration of the calibration of analytical systems involving fluid particle study is covered. In the copending patent application, a calibration system having the same purpose as the purpose of the subject system is described. However, instead of a translatable slide as presently disclosed, the simulator device comprises a rotatable disc for generation of calibration signals. Like reference characters are used between the present application and the above-mentioned copending application wherever possible to further the understanding of the inventions.

In present FIG. 1, a substantially flat calibration slide 30 has disposed thereon a number of typical calibration areas of contrast 12 for scanning by a vidicon tube included within an analytical system 14, schematically illustrated in the FIGURES. The analytical system 14 generally comprises an optical portion, scanning devices, including a vidicon tube and electrical signal generation devices which are more fully discussed hereinafter. It is easily appreciated that the contrast areas 12 need to optically differ in appearance from the surface of the slide on which the areas are disposed and if optically designed for the light to pass through the slide, the slide material which makes up the thickness of the slide must also differ in appearance from the areas of contrast. The contrast in appearance, for example, can be due to shape or size or as is preferred due to color, shade or tone or some combination of the above. If the slide is not of transparent material, the particles may comprise undarkened areas of an otherwise darkened slide and could conceivably be holes within the slide. The areas of contrast are generally of the same size, but may comprise two or more size populations, and are disposed upon or adherred to the slide 30 in any suitable manner. The areas 12 may be formed upon a photographic film or include a pattern made by a ruling engine and comprise individual thin layers of chrome. It is easily appreciated that any appropriate replication procedure will provide a suitable contrasting pattern. On a transparent slide, such as light passing plastic or glass, the areas of contrast 12 may comprise, for example, small dots of paint. The image width of the particle simulated areas for calibration in an analytical system for analyzing liquid waste, for example, is approximately 0.4 percent of the field of view.

The areas of contrast 12 are preferably disposed upon a face of either side of the slide 30 in a predetermined pattern, but may be enclosed within a slide which is of transparent material. In order for the software of the embodiment disclosed in assignee's concurrently filed and copending patent application entitled "APPARATUS FOR AND METHOD OF AUTOMATICALLY DETERMINING VELOCITY RELATED PARAMETERS OF FLUID BORNE COLLOIDAL SUSPENSIONS," Ser. No. 408,202 for applicant Roger Morton, to be utilized in analysis of simulated particle movement for the presently disclosed invention, the pattern preferably should be formed for all particles to exhibit the same linear velocity with respect to the optical axis B–B' of the analytical system and further, for the pattern to substantially meet the criteria set forth for the ensemble average computation disclosed in the same R. Morton patent application. Advantages of the translatory embodiment of FIG. 1 became more evident when considered in light of the software and ensemble average computation considerations.

The slide 30 is appropriately constrained to move in a linear path perpendicular to the optical axis B–B' within a calibration plane of focus A–A' of the optical portion of the analytical system 14, as best seen in FIG. 2. As an example, the motion of the slide is shown to be controlled by motor 32 through a lead screw 34 and a nut 36. It will be appreciated, however, that other mechanisms to control the linear motion of the slide in the appropriate manner are within the intent of this invention. The location of the calibration plane of focus A–A' is dependent upon the structural limitations and disposition of the elements of any embodiment according to the principles of the present invention. In the illustrated embodiment, the slide 30 defines the calibration plane of focus and is preferably disposed very close to the vidicon face on which the image is formed in order to provide a sharp image for analysis. Primarily for convenience in design and manufacturing, the slide 30 is not disposed in the prime optical field of focus which passes through the measuring cell 14, although it might well have been. It will be appreciated that the closer the slide 30 is to the vidicon tube the sharper are the images of the calibration areas of contrast. Image shadows generated by the calibration areas of contrast diminish in size and have less and less adverse effects on the analytical results the closer the slide 30 is to the vidicon tube.

There are at least a sufficient number of areas of contrast for the analytical system 14 to generate information signals to very accurately calibrate the analytical system. The areas of contrast, for example, in a fluid waste system may number approximately thirty.

The slide 30 is translated by means of the motor 32 which operates at a predetermined velocity, for example, in the direction of arrow 38 to dispose the areas of contrast 12 within the calibration plane of focus A–A' to intercept an optical axis B–B' defined by the beam of light from the analytical system 14 passing through a microscope objective lens 19. In FIG. 1, the path of a slide 30 would carry it before the analytical system 14 and the optical axis B–B' shown by the point upon the diagramatic illustration of the analytical system 14.

As is illustrated in FIG. 1, the slide 30 may be generally rectangular. A slide embodiment is preferably rectangular for reasons of stability during translation and for space saving reasons within an instrument incorporating the analytical system and peripheral components.

Further, it will be appreciated that during times of calibration for an optical design not totally dependent upon reflectance, any optically in-line fluid particle measurement cell, illustrated by exemplary cell 22 is either clear of fluid bearing particles or made to appear as being optically clear in order that there is no outside particulate influence during the calibration procedure. At the completion of calibration, the slide is made to stop outside the optical axis path B–B', as shown in FIG. 1.

With reference to FIG. 2, initially, the slide 30 is located out of the field of view of the vidicon. During the calibration the slide is translated along the axis A–A' to cause the movement of said images of said contrast areas across the face of the vidicon, therefore generating said information signals to very accurately calibrate the analytical system.

After a predetermined amount of translation, the calibration is completed and the slide is returned to its initial position, preferably out of the optical path defined by axis B–B'. It will be appreciated that the calibration slide 30 may be disposed in a location other than the one indicated in FIG. 2. In that case the arrangement of FIG. 3, involving a beam-splitter 24 may be used. It will be appreciated that other standard optical components, such as an additional lens 26 and a lamp 28, are needed for completion of the optical portion of the illustrated embodiment.

This invention can apply to use with measuring cells of a kind illustrated in the before mentioned concurrently filed and copending patent application entitled "APPARATUS FOR AND METHOD OF AUTOMATICALLY DETERMINING VELOCITY RELATED PARAMETERS OF FLUID BORNE COLLOIDAL SUSPENSIONS," for applicant Roger Morton and U.S. Pat. No. 3,723,712 entitled "METHOD FOR AGGLOMERATION MEASURING AND CONTROL" issued in the names of applicants Thomas R. Komline, Sr. and Walter R. Wills and assigned to Komline-Sanderson Engineering Corporation, Peapack, N.J.

In operation, calibration information is obtained from the areas of contrast translating at the controlled velocity before the analytical system 14, including an optical portion, scanning devices and signal generation devices which operate in accordance with the principles and the manner set forth in the disclosure of co-pending patent application entitled "METHODS OF AND APPARATUS FOR DETERMINING THE QUANTITY AND PHYSICAL PARAMETERS OF OBJECTS," Ser. No. 210,278, filed Dec. 20, 1971, now U.S. Pat. No. 3,805,028, issued on Apr. 16, 1974 for applicant Roger Morton and assigned to Bausch and Lomb Inc. and in the manner further disclosed in applicant's beforementioned patent application concurrently filed with the present application.

The described calibration system and embodiment is for calibration of the analytical portion of the system and not specifically for the optical portion. If the optical portion, which in a system having electronic and mechanical components is the least likely to need calibration after manufacturing, is to be calibrated, it is most suitable to provide an optical calibration slide for disposition in the optical plane of focus passing through the measuring cell. With the measuring cell removed which can readily be accomplished under manufacturing conditions, calibration of the optical system can easily be conducted. From a practical standpoint, generally, optical calibration need not be considered again in the type of analytical systems under consideration. Once optically calibrated, considering the fluid has equal distribution of particles, out-of-focus particles on opposite sides of the plane of focus passing through the cell, will provide compensating errors in the computation of zeta potential.

The following is claimed:

1. A calibration apparatus for calibrating a particle velocity measuring instrument defining an optical path for optically viewing particulate matter to generate signals as a function of the velocity of the particulate matter, comprising:
   a slide disposed for receiving light emanating from along the defined optical path;
   areas of contrast disposed upon the slide for receiving the light emanating from along the optical path to be optically viewed by the particle velocity measuring instrument; and
   means for moving the areas of contrast disposed upon the slide in a linear path at a predetermined rate across the received light emanating from along the optical path for the generation of calibration signals as a function of the velocity of the areas of contrast traversing the received light at a predetermined rate.

2. The calibration apparatus as defined in claim 1, wherein the areas of contrast upon the slide are disposed for traversing the optical path defined by the velocity measuring instrument.

3. The calibration apparatus as defined in claim 1, including means for passing light emanating from along the defined optical path to the slide and the areas of contrast disposed upon the slide where the slide and the areas of contrast are disposed outside the optical path defined by the velocity measuring instrument.

4. The calibration apparatus as defined in claim 3, wherein the means for passing light emanating from along the defined optical path is a beam splitter disposed for receiving light along the defined optical path.

5. The calibration apparatus as defined in claim 1, wherein the slide is substantially flat and is defined of material having given optical properties and has disposed on one of its surfaces, areas of contrast which have optical properties differing from the optical properties of the slide.

6. The calibration apparatus as defined in claim 1, wherein the slide is translucent and the areas of contrast disposed upon the slide are substantially opaque.

7. The calibration apparatus as defined in claim 1, wherein the means for moving the areas of contrast disposed upon a slide in a linear path at a predetermined rate includes a lead screw having two ends one of which is connected to the slide the other of which is connected to a controlled motor for translating the slide across the received light emanating from along the optical path.

* * * * *